United States Patent
Fuchs et al.

(10) Patent No.: US 7,393,111 B2
(45) Date of Patent: Jul. 1, 2008

(54) PIVOTING OUTSIDE MIRROR FOR A MOTOR VEHICLE

(75) Inventors: Hans-Joachim Fuchs, Holland, MI (US); Helmut Weimer, Kirschfurt (DE)

(73) Assignee: Donnelly Hohe GmbH & Co. KG, Collenberg (DE)

(*) Notice: Subject to any disclaimer, the term of this patent is extended or adjusted under 35 U.S.C. 154(b) by 930 days.

(21) Appl. No.: 09/895,917

(22) Filed: Jun. 29, 2001

(65) Prior Publication Data
US 2002/0001148 A1  Jan. 3, 2002

(30) Foreign Application Priority Data
Jul. 3, 2000   (DE) ................ 100 31 330

(51) Int. Cl.
*G02B 7/182* (2006.01)
*B60R 1/06* (2006.01)

(52) U.S. Cl. ............. 359/841; 359/872; 248/477; 248/478; 248/479

(58) Field of Classification Search ........ 359/841, 359/872, 877; 248/477, 478, 479
See application file for complete search history.

(56) References Cited

U.S. PATENT DOCUMENTS

| | | | |
|---|---|---|---|
| 3,889,915 A | | 6/1975 | Hashiguchi et al. |
| 4,626,083 A | * | 12/1986 | Nakayama et al. ......... 359/841 |
| 4,626,084 A | * | 12/1986 | Kumai |
| 4,728,181 A | | 3/1988 | Kakinuma |
| 4,789,232 A | | 12/1988 | Urbanek |
| 4,981,349 A | * | 1/1991 | Tamiya et al. |
| 4,982,926 A | * | 1/1991 | Mori et al. |
| 5,005,797 A | * | 4/1991 | Maekawa et al. |
| 5,384,660 A | * | 1/1995 | Oishi ....................... 359/841 |
| 5,432,640 A | * | 7/1995 | Gilbert et al. |
| 5,432,641 A | * | 7/1995 | Mochizuki ................ 359/841 |
| 5,477,392 A | * | 12/1995 | Mochizuki et al. |
| 5,523,894 A | * | 6/1996 | Koiwai |
| 5,636,071 A | * | 6/1997 | Mochizuki et al. ........ 359/877 |
| 5,639,054 A | * | 6/1997 | Gerndt et al. ............. 248/478 |
| 5,828,504 A | * | 10/1998 | Beuzeville ................ 359/841 |
| 6,022,113 A | * | 2/2000 | Stolpe et al. |

(Continued)

FOREIGN PATENT DOCUMENTS

DE   1 755 577   5/1972

(Continued)

*Primary Examiner*—Ricky D Shafer
(74) *Attorney, Agent, or Firm*—McGlew & Tuttle, P.C.

(57) ABSTRACT

An outside mirror for a motor vehicle has a mirror foot (1) fastenable to the vehicle and a mirror carrier (3) fastenable to the mirror foot so as to be capable of swivelling about a swivelling axis. The mirror carrier (3) is fastenable to the mirror foot (1) by virtue of the latching of at least one first detent element (11) in a first detent contour (12). In this the position of the mirror carrier (3) relative to the mirror foot (1) at at least one defined swivel angle may be secured by virtue of the latching of at least one second detent element in a second detent contour (15, 16). The mirror carrier (3) in the latched state of the first detent element (11) is displaceable counter to the pressure of a spring element (11) at least far enough in the direction of the swivelling axis for the second detent element to be unlatchable from the second detent contour (15, 16) through swivelling of the mirror carrier (3).

15 Claims, 2 Drawing Sheets

U.S. PATENT DOCUMENTS

| | | | |
|---|---|---|---|
| 6,092,778 A * | 7/2000 | Lang et al. | |
| 6,130,514 A * | 10/2000 | Oesterholt et al. | |
| 6,183,098 B1 * | 2/2001 | Martin | 359/871 |
| 6,322,221 B1 * | 11/2001 | Van De Loo | |
| 6,390,630 B1 * | 5/2002 | Ochs | |
| 2002/0001148 A1 * | 1/2002 | Fuchs et al. | 359/872 |

FOREIGN PATENT DOCUMENTS

| | | |
|---|---|---|
| DE | 28 50 164 A1 | 6/1979 |
| DE | 40 31 032 C2 | 4/1991 |
| DE | 195 20 656 A1 | 2/1996 |
| EP | 0 846 596 A2 | 6/1998 |
| EP | 0 995 634 A2 | 4/2000 |
| GB | 1 212 988 | 11/1970 |

* cited by examiner

PIVOTING OUTSIDE MIRROR FOR A MOTOR VEHICLE

FIELD OF THE INVENTION

The invention relates to a pivotally supported outside rear view mirror, for a motor vehicle, with a mirror foot fastenable to the vehicle and a mirror carrier fastenable to the mirror foot so as to be capable of swivelling about a swivelling axis, wherein the mirror carrier is fastenable to the mirror foot by virtue of the latching of at least one first detent element in a first detent contour.

BACKGROUND OF THE INVENTION

Outside rear view mirrors of the type described comprise a mirror foot and a mirror carrier, which is fastenable to the mirror foot so as to be capable of pivoting around a swivelling axis. The mirror foot may in such case be fastened by suitable fastening means to the vehicle and is therefore used to fix the outside mirror on the motor vehicle. The various components needed for operation of an outside mirror, such as a mirror element, an adjusting mechanism, a positioning drive, a heating device and a mirror housing, may be fastened to the pivotally supported mirror carrier.

According to vehicle registration regulations, pivotal supporting of the mirror carrier on the mirror foot is compulsory in modern motor vehicles. The aim is in particular to reduce the risk of injury in the event that a victim of an accident collides with the outside rear view mirrors, which protrude laterally from the body of the motor vehicle. Thus, for example, before an outside mirror is approved a so-called "child's head test" is conducted. During such test, a test specimen corresponding in weight and shape to the dimensions of a child's head is brought into collision with the outside mirror which, in order to pass the test, has to be made to fold inwards by the impact.

Because of the pivotal supporting of the mirror carrier on the mirror foot, conflicting objectives have to be taken into account when designing an outside mirror. On the one hand, the mirror carrier where possible is to be capable of swivelling without great resistance out of its normal position into a folded-in position in order to reduce the risk of injury. On the other hand, while the outside mirror is in operation, the mirror carrier has to be connected as firmly as possible to the mirror foot in order to rule out unintentional displacement of the mirror carrier, especially as a result of vibration. To resolve such a conflict of objectives, U.S. Pat. No. 4,728,181 proposes the use of an elastically supported detent element between mirror carrier and mirror foot. This detent element secures the position of the mirror carrier at a defined swivel angle, which corresponds precisely to the normal position of the outside mirror for observing the traffic behind. When a force directed from front to back or vice versa acts upon the mirror carrier, the detent element disposed between mirror carrier and mirror foot unlatches and therefore allows a substantially resistance-free swivelling of the mirror carrier.

During assembly of the outside mirror, the mirror carrier has to be fastened to the mirror foot in a pivotally supported manner. To solve this fastening problem, it is known e.g. from DE 28 50 164 A1 to provide on the mirror carrier a fastening pin, which is inserted through an eye provided on the mirror foot. After the fastening pin has been inserted through the eye, a fastening screw is attached to the free end of the fastening pin and a spring is placed in between. The effect thereby achieved is that the mirror carrier is preloaded by its fastening pin elastically in the eye of the mirror foot and may be displaced counter to the pressure of the spring in the direction of the swivelling axis. By virtue of the mirror carrier being supported so as to be displaceable axially in the direction of the swivelling axis, it is possible to arrange between mirror carrier and mirror foot detent elements, by means of which the mirror carrier is held in its normal position. As soon as a forward- or rearward-directed force acts upon the outside mirror, this detent element unlatches in that, because of the swivelling motion occasioned by the force, the mirror carrier is pressed upwards in the direction of the swivelling axis and so the detent elements may be moved out of engagement. The drawback of this known design is that it entails a considerable constructional outlay and is relatively difficult to assemble.

From EP 0 846 596 A2 an outside rear view mirror, which is particularly easy to assemble, is known. To simplify assembly, mirror foot and mirror carrier are designed in such a way that the mirror foot is latchable to the mirror carrier. For fastening the mirror carrier to the mirror foot it is possible, for example, to provide radially elastic detent hooks on the mirror carrier, which are latchable to a counterpart detent device provided in the component wall of the mirror foot. The drawback of the outside mirror known from EP 0 846 596 A2 is that the position between mirror carrier and mirror foot is secured not by positive locking, e.g. by means of a detent element, but by frictional engagement. As the friction between the friction surfaces provided on the mirror carrier and on the mirror foot is subject to specific tolerances, reliable adjustment of the friction force acting between mirror foot and mirror carrier is not possible. Consequently, it may happen that the mirror carrier may either swivel too readily, so that it drifts out of the desired position e.g. as a result of vibration, or is too difficult to adjust so that, for example, it fails the "child's head test".

SUMMARY AND OBJECTS OF THE INVENTION

The object of the present invention is to provide an outside mirror, which is easy and inexpensive to manufacture and assemble and which at the same time reliably secures the position of the pivotally supported mirror carrier in at least one angular setting.

According to the invention, a pivotally supported outside rear view mirror is provided for a motor vehicle. The rear view mirror has a mirror foot fastenable to the vehicle and a mirror carrier fastenable to the mirror foot so as to be capable of swivelling about a swivelling axis. The outside rear view mirror comprises at least one first and one second detent element, wherein the detent elements are latchable in opposing detent contours. As such, it is fundamentally immaterial whether the detent elements or the detent contours are disposed on the mirror foot or on the mirror carrier. The first detent element with the associated detent contour is used to fasten the mirror carrier on the mirror foot so that the mirror carrier, as a result of latching of the detent element in the detent contour, is mountable in a pivotally supported manner on the mirror foot. The second detent element is used to secure the position of the mirror carrier at at least one defined swivel angle relative to the mirror foot through positive latching of the second detent element into the second detent contour. By virtue of the positive securing of the position, an unintentional swivelling of the mirror carrier is reliably ruled out even in the event of stronger vibrations. According to the invention, the first detent element with the associated detent contour is designed in such a way that the mirror carrier in the latched state of the first detent element, i.e. without release of the detent connection between mirror carrier and mirror foot, is displaceable in the direction of the swivelling axis. In other words, the mirror carrier may be not only swivelled about the swivelling axis but also displaced linearly in the direction of the swivelling axis. The second detent element and the associated second detent contour are in such case designed in such a way that by swivelling the mirror carrier the second detent element is disengageable from the second detent contour. The release of the positive locking between second detent element and second detent contour is easily made possible by virtue of the mirror carrier being supported so as to be linearly displaceable in the direction of the swivelling axis. For, e.g. by virtue of the slight lifting of the mirror carrier relative to the mirror foot, the second detent element may be moved out of engagement. At the same time, according to the invention a spring element is provided on the outside rear view mirror and braces the mirror carrier against the mirror foot. To unlatch the second detent element, the mirror carrier has to be displaced counter to the pressure of the spring element in the direction of the swivelling axis, with the result that an unintentional unlatching of the second detent element, e.g. as a result of vibrations, is reliably prevented.

According to a preferred embodiment of the invention, the second detent element and/or the second detent contour comprises at least one sliding surface extending obliquely from the bottom up relative to the swivelling axis. During unlatching of the second detent element, the second detent element slides continuously up along the sliding surface as if moving along an inclined plane so that the force needed to unlatch the second detent element increases substantially linearly. The detent element, as soon as it has reached the top end of the sliding surface, is completely unlatched so that only a relatively low force is then required for further swivelling of the mirror carrier.

The spring element required for operation of the outside mirror according to the invention may of course, as is known from prior art, take the form of a separate component e.g. in the style of a helical spring. To further reduce production costs by cutting down the number of components, it is particularly advantageous when the first detent element in the latched state is movable in the manner of a preloaded spring element into engagement with the first detent contour. The effect thereby achieved is that the first detent element in the latched state braces the mirror carrier with a specific initial tension elastically against the mirror foot and hence ensures that the second detent element is reliably seated in the second detent contour. In other words, by functionally integrating the bracing function in the component of the first detent element it is possible to dispense with a separate spring element. To this end, the first detent element may, for example, be coupled elastically to the mirror foot or mirror carrier.

The first detent element is preferably designed in such a way that by virtue of a relative movement between mirror carrier and mirror foot in the direction of the swivelling axis a corresponding, oppositely directed restoring force may be generated through elastic deformation of the first detent element.

According to the invention, through latching of the first detent element in the first detent contour on the one hand the mirror carrier has to be fastenable securely to the mirror foot and on the other hand a linear displaceability of the mirror carrier in the direction of the swivelling axis has to be guaranteed. It therefore follows that the first detent element has to come into engagement in the first detent contour in such a way that the first detent element is displaceable relative to the first detent contour without unlatching from the first detent contour. This is achievable in particular in that at least one of the opposing detent portions of the first detent element and/or of the first detent contour, which are applied during latching in each case against the opposing detent portion, extends in a reference plane, which extends at an angle of 1° to 89° relative to the reference planes defined by the swivelling axis. In particular, angles of 40° to 50° have proved particularly advantageous. The effect achieved by the arrangement of the detent portions so that they extend obliquely relative to the swivelling axis is that, on the one hand, the detent portions which after latching are applied against one another engage positively one behind the other in order to fasten the mirror carrier to the mirror foot and, on the other hand, the detent portions in the event of an axial relative movement between first detent element and first detent contour may slide one along the other in the manner of one or two inclined planes. In this case, it is of course necessary to ensure that the first detent element and/or the first detent contour are movably arranged and/or of a deformable design so as to enable the displacement and/or deformation needed for sliding-along of the mutually applied detent portions.

Since, for the pivotal supporting of the mirror carrier on the mirror foot, it is particularly easy to use circular-symmetrical retaining elements, e.g. a retaining pin or a sleeve, the detent portion of the first detent element and/or of the first detent contour may be formed particularly easily by an, at least in sections, conically constructed wall portion. In this case, it is naturally sufficient for the conical construction of the wall portion in cross section to be present only in regions, e.g. in the region of protruding lugs.

According to a preferred embodiment of the invention, the first detent element is designed in the manner of a detent tongue. In this case, the first end of the detent tongue is coupled in an elastically sprung manner to the mirror carrier or mirror foot. The second end of the detent tongue is displaceable relative to the articulation point of the detent tongue and comprises a detent portion, which is latchable into the first detent contour. Such detent tongues are known in principle from the prior art and function during latching in that the detent tongue for latching is pressed in the direction of its longitudinal extension into the detent contour. During such relative movement between detent tongue and detent contour, the free end of the detent tongue is pressed by a corresponding projection of the detent contour elastically to the side until the detent portion latches into the detent contour and hence locks the detent tongue against unintentional retraction. Such detent tongues may be provided particularly easily on plastic injection-moulded parts.

For pivotal support of the mirror carrier on the mirror foot, it is advantageous when a circular-symmetrical retaining element extending in the direction of the swivelling axis is disposed on the mirror carrier or mirror foot. The retaining element may be designed, for example, in the manner of a tube, pin or sleeve. Upon fastening the mirror carrier to the mirror foot, the retaining element is inserted by its free end into a functionally complementary recess. In this case, it is of course immaterial whether the retaining element and/or the recess are disposed on the mirror carrier or on the mirror foot.

To form the detent tongues used to fasten the mirror carrier, substantially U-shaped notches may preferably be provided in the lateral surface of a sleeve serving as a retaining element. By means of such notches resiliently coupled detent tongues are cut out of the component wall of the sleeve, wherein the elastic spring properties of the detent tongues in this case depend substantially upon the material and dimensions of the sleeve wall. Such notches may either be subsequently introduced into an existing sleeve or be provided in the component wall, e.g. by injection molding, during manufacture of the sleeve.

In order to guarantee a substantially vibration-free seat of the mirror carrier on the mirror foot, it is necessary for the mirror carrier also to be guided substantially without play in radial direction relative to the swivelling axis. The radial guidance of the mirror carrier may firstly be guaranteed by the latched first detent element. However, as the support of the mirror carrier calls for guidance in a radial direction at at least two points, guide surfaces, in particular protruding guide lugs, may preferably be provided in the recess for receiving the retaining element. Such guide surfaces may be brought radially from the outside into contact with the circular-symmetrical retaining element so that the retaining element, e.g. a sleeve, is supported and hence guided without play in a radial direction.

To prevent excessive swivelling of the mirror carrier, during which the outside rear view mirror might, for example, knock in an undesirable manner against the side windows of the vehicle, a swivel-limiting device may be provided on the outside rear view mirror. Such swivel-limiting device may take the form of a lug, which is movable into engagement in an opposing groove. In this case, it is naturally immaterial whether lug and/or groove are disposed on the mirror carrier or on the mirror foot. To limit the swivelling motion, the groove is delimited so that the lug may come to lie against the ends of the groove and therefore positively prevents further swivelling.

The invention is used in particular to manufacture particularly inexpensive outside mirrors. The production costs for such mirrors may be reduced in particular by manufacturing substantially all of the mirror carrier and/or mirror foot from plastic material. In particular, the mirror carrier and/or mirror foot may be manufactured by injection molding. The elastic properties of plastics material in particular allow an elastically resilient design of the first detent element, e.g. in the form of a detent tongue, without additional spring elements.

A further cost reduction may be achieved when the mirror carrier and/or mirror foot are of a substantially one-piece design.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
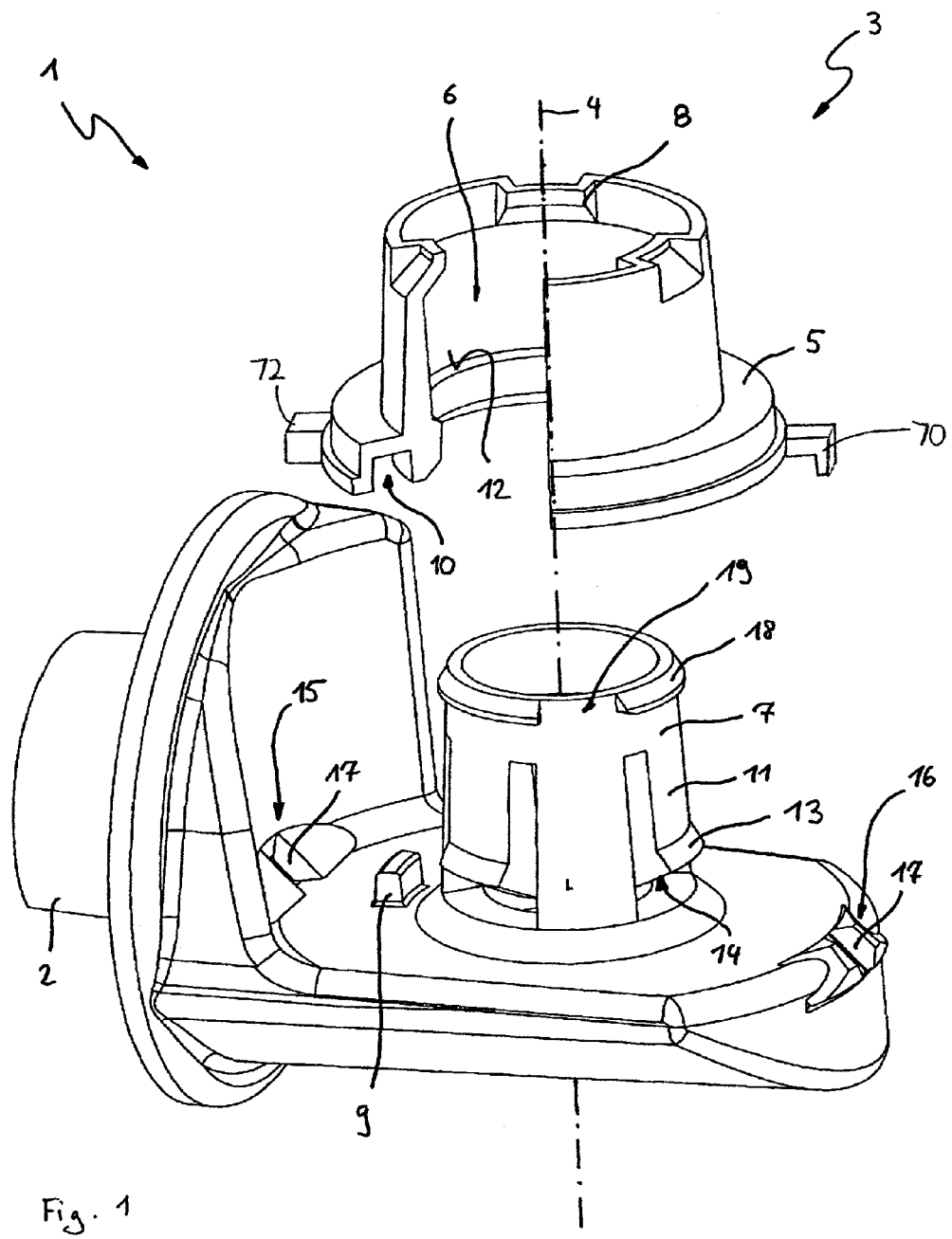
FIG. 1 is an exploded perspective view of a first embodiment of a mirror foot and a partially illustrated mirror carrier.

Referring to the drawings in particular, FIG. 1 shows a mirror foot 1, which may be manufactured in one piece from a plastic material by injection moulding and is fastenable by means of a flange 2 to the body of a non-illustrated motor vehicle. A mirror carrier 3, which is only partially illustrated, may be fastened to the mirror foot 1 so as to be capable of swivelling about a swivelling axis 4. For greater clarity, FIG. 1 shows only a part 5 of the mirror carrier 3 which is used to fasten the mirror carrier 3 to the mirror foot 1. The mirror carrier 3, insofar as it is not illustrated in FIG. 1, corresponds to the mirror carriers known from prior art. In this case, it should be pointed out that the part 5 may either be integrated integrally in the mirror carrier 3, so that the external contour of the part 5 shown in FIG. 1 disappears, or the part 5 is designed as a separate component which is fastened by suitable fastening means to a second part of the mirror carrier 3.

The part 5 of the mirror carrier 3 has a circular-symmetrical recess 6, into which a sleeve 7 designed as a retaining element and formed on the mirror foot 1 may be inserted. To afford a clearer view of the recess 6, the part 5 of the mirror carrier 3 is shown broken open in FIG. 1.

The length and diameter of the sleeve 7 and the recess 6 in the mirror carrier 3 are in this case designed in a functionally complementary manner so as to enable, after fastening of the part 5 on the mirror foot 1, a swivelling motion of the mirror carrier 3 about the swivelling axis 4. To guarantee a substantially play-free radial seat of the part 5 on the sleeve 7, on the top end of the part 5 three guide lugs 8 are formed, the radially inwardly directed guide surfaces of which, after fastening of the part 5, come to rest against the top circumference of the sleeve 7. To limit the swivelling motion of the mirror carrier 3 about the swivelling axis 4, a lug 9 is formed on the mirror foot 1 and engages into a groove 10 in the part 5 of the mirror carrier 3. The groove 10 is delimited at two ends so that the lug 9, for limiting the swivelling motion of the mirror carrier 3, is movable into contact with non-illustrated end surfaces.

Three U-shaped notches are provided in the wall of the sleeve 7 and form three detent tongues 11. The three detent tongues 11 act as three first detent elements and are used for latchable fastening of the mirror carrier 3 to the mirror foot 1. For latching the part 5 on the mirror carrier 3, in the recess 6 a conical wall portion 12 is provided, behind which the free ends 13 of the detent tongues 11 may engage and latch. The wall portion 12 forms a first detent contour. To this end, in sections conically designed, downward directed detent portions 14 are provided on the free ends 13 of the detent tongues 11 and come to rest after latching of the part 5 from above against the conical wall portion 12. By virtue of their being wedge-shaped at the free ends 13, the detent tongues 11 guarantee that the part 5 is seated substantially without play in a radial direction. By virtue of the angular arrangement of the reference planes defined by the detent portion 14 and/or by the conical wall portion 12 relative to the reference planes defined by the swivelling axis 4, it is guaranteed that the part 5 and hence the mirror carrier 3 may be displaced at least slightly upwards axially in the direction of the swivelling axis 4 without the detent tongues 11 unlatching. During such linear motion, the free ends 13 of the detent tongues 11 are pressed progressively radially inwards by the conical wall portion 12 in the recess 6, wherein the elastically sprung coupling (spring action) of the detent tongues 11 counteracts the radially inwardly directed motion of the free ends 13. The effect thereby achieved is that, because of the spring forces applied by the detent tongues 11, the part 5 with the mirror carrier 3 is preloaded down towards the mirror foot 1 and in the event of axial displacement in the direction of the swivelling axis 4 the spring force directed counter to the motion becomes continuously greater with increasing excursion. In other words, the detent tongues 11 on the one hand ensure reliable latching of the part 5 comprising the mirror carrier 3 on the mirror foot 1 and at the same time act like a compression spring, which braces the part 5 against the mirror foot 1.

Arranged radially opposite one another on the mirror foot 1 are two detent contours 15 and 16, into which two functionally complementary detent elements 70,72 on the mirror carrier may engage. The detent contours 15 and 16 each comprise a wedge shaped indentation, which forms in each case two sliding surfaces 17, which extend obliquely from the bottom up and along which the detent elements on the mirror carrier 3 may slide in an upward direction. The detent contours 15 and 16 are in this case disposed on the mirror foot 1 in such a way that, after latching of the appropriate detent elements of the mirror carrier 3 in the detent contours 15 and 16, the mirror carrier 3 is secured in a predefined normal position. Because of the mirror carrier 3 being preloaded by the detent tongues 11 towards the mirror foot 1 it is guaranteed that the detent elements of the mirror carrier 3 do not unintentionally disengage from the detent contours 15 and 16. By virtue of the axial displaceability of the part 5 having the mirror carrier 3 fastened thereto it is simultaneously guaranteed that, in the event of a specific force being applied against the mirror carrier 3, the latter is swivelled out of the normal position into a folded-in position. For, by virtue of the applied force the detent elements of the mirror carrier 3 are pressed up along the sliding surfaces 17 as the swivel angle increases, wherein the preloading force of the detent tongues 11 has to be overcome. As soon as the detent elements on the mirror carrier 3 have reached the top end of the sliding surfaces 17 of the detent contours 15 and 16, the detent element unlatches and may be swivelled substantially without greater resistance about the swivelling axis 4. After unlatching of the mirror carrier 3, the latter may, by being swivelled backwards, latch once more in its normal position in the detent contours 15 and 16.

A securing collar 18 is pre-formed on the upper end of the sleeve 7. Undesirable detachment of the mirror carrier 3 is reliably precluded by means of the securing collar 18, since the guide lugs 8 cannot be drawn off over the securing collar 18. For the purpose of assembling or disassembling the mirror carrier 3, three breaks 19, through which the guide lugs 8 can be drawn off in a specific angular position of the mirror carrier 3, are provided on the securing collar 18.

Figure 2:
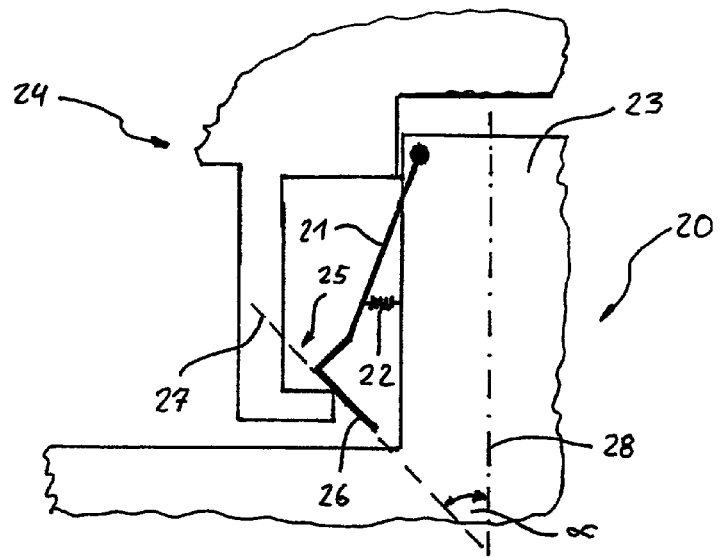
FIG. 2 is a sectional view of a second embodiment of a partially illustrated mirror foot and a partially illustrated mirror carrier.
Figure 3:
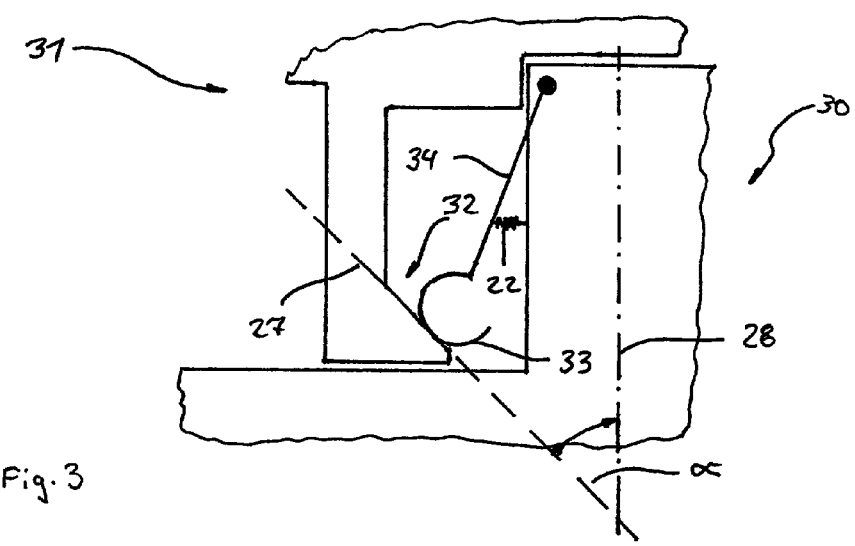
FIG. 3 is a sectional view of a third embodiment of a partially illustrated mirror foot and a partially illustrated mirror carrier.
Figure 4:
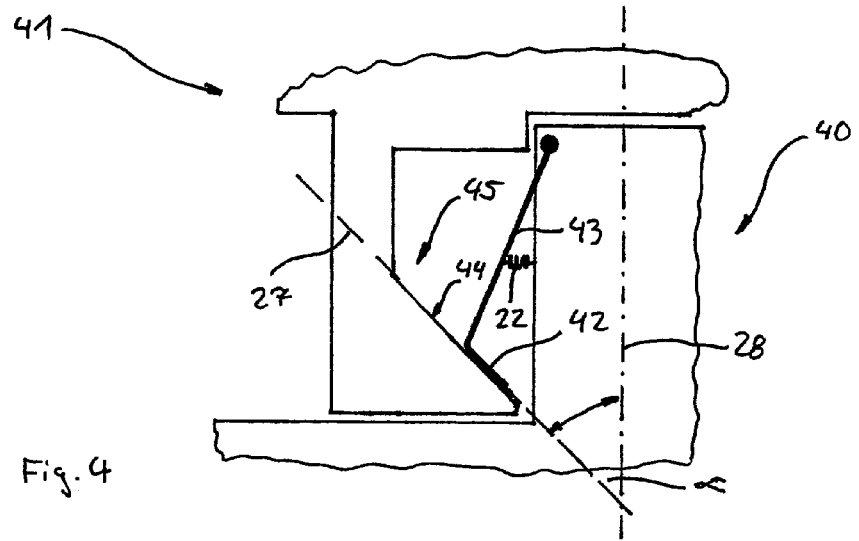
FIG. 4 is a sectional view of a fourth embodiment of a partially illustrated mirror foot and a partially illustrated mirror carrier.

FIGS. 2, 3 and 4 are diagrammatic views showing various possible ways of designing a latchable bearing seat for fastening a mirror carrier to a mirror foot.

A detent element 21 is hinge-connected to the mirror foot 20 shown in FIG. 2 and supported by means of a spring element 22 relative to the retaining element 23, which is used to fasten a mirror carrier 24. Provided on the mirror carrier 24 is a detent contour 25, into which the detent element 21 for fastening the mirror carrier 24 to the mirror foot 20 is latchable. The detent portion 26 of the detent element 21 in this case extends in a reference plane 27, which extends at an angle a of 45° relative to the reference planes defined by the swivelling axis 28. By virtue of the difference between the reference planes of the bearing seat between mirror foot 20 and mirror carrier 24, on the one hand, and of the latching between the detent element 21 and the detent contour 25, on the other hand, it is guaranteed that the mirror carrier 24 is displaceable at least slightly upwards axially in the direction of the swivelling axis 28 without the detent element 21 unlatching. Furthermore, by virtue of the difference between the reference planes it is guaranteed that the mirror carrier 24 is drawn by a specific initial tension towards the mirror foot 20.

FIG. 3 shows a further possible embodiment for the latching of a mirror foot 30 to a mirror carrier 31. It is evident here that the detent contour 32 of the mirror carrier 31 extends at an angle α relative to the swivelling axis 28, with the result that the circular-symmetrical detent portion 33 at the free end of the detent element 34 is driven by the spring element 22 and may slide up and down in the detent contour 32.

FIG. 4 shows a further embodiment for the latching of a mirror foot 40 to a mirror carrier 41. Here it is evident that both the detent portion 42 and the detent contour 45 extend at an angle α of around 45° relative to the swivelling axis 28.

While specific embodiments of the invention have been shown and described in detail to illustrate the application of the principles of the invention, it will be understood that the invention may be embodied otherwise without departing from such principles.

What is claimed is:

1. An outside mirror for a motor vehicle comprising:
a mirror foot fastenable to the vehicle;
a mirror carrier fastenable to the mirror foot so as to be capable of swiveling about a swiveling axis;
a circular symmetrical retaining element in the form of a sleeve connected to said mirror foot, said retaining element extending in a direction of said swiveling axis for fastening said mirror carrier to said mirror foot, said retaining element being insertable by a free end into a functionally complementary recess of said mirror carrier;
guide surfaces disposed in said recess of said mirror carrier for receiving said retaining element, said guide surfaces including protruding guide lugs whereby a swiveling motion of said mirror carrier on said retaining element may be guided in a radial direction substantially without play;
a first detent element associated with one of said mirror foot and said mirror carrier, said first detent element being flexible such that said first detent element deflects when said mirror carrier engages said mirror foot, whereby said first detent element generates a spring force to maintain said mirror carrier with a specific initial tension elastically against said mirror foot;
a first detent contour associated with the other of said mirror foot and the mirror carrier, said mirror carrier being connected to said mirror foot via engagement of said first detent element with said first detent; and
a second detent contour associated with the mirror foot, the position of the mirror carrier relative to the mirror foot being secured at at least one defined swivel angle when said mirror carrier engages said second detent contour, said sleeve being located within said mirror carrier when said mirror carrier engages said second detent contour of said mirror foot, said mirror carrier being movable in a direction of said swiveling axis, counter to pressure of said spring force such that said mirror carrier disengages said second detent contour via swiveling said mirror carrier about said swiveling axis when a force is applied to said mirror carrier.

2. An outside mirror according to claim 1, wherein said mirror carrier or the second detent contour comprise at least one sliding surface extending obliquely from the bottom up relative to the swiveling axis whereby said mirror carrier upon unlatching from said second detent contour is pressed in the direction of the swiveling axis.

3. An outside mirror according to claim 1, wherein the first detent element in a latched state is movable in the manner of a preloaded spring element into engagement with the first detent contour so that the first detent element in the latched state braces the mirror carrier with the specific initial tension elastically against the mirror foot.

4. An outside mirror according to claim 1, wherein said first detent element has spring characteristics wherein upon a relative movement between said mirror carrier and said mirror foot in the direction of the swiveling axis a corresponding, oppositely directed restoring force may be generated through elastic deformation of said first detent element.

5. An outside mirror according to claim 1, wherein the first detent element and the first detent contour each comprise a detent portion which, during latching, comes to rest against the respective opposing detent portion, wherein at least one of the opposing detent portions extends in a reference plane, which extends at an angle α of 1° to 89°, relative to reference planes defined by the swiveling axis.

6. An outside mirror according to claim 5, wherein the angle α is an angle of 40° to 50°, relative to the reference planes defined by the swiveling axis.

7. An outside mirror according to claim 5, wherein the detent portion of the first detent element or the first detent contour is formed, at least in sections, by a conical wall portion.

8. An outside mirror according to claim 1, wherein the first detent element includes a detent tongue with a first end coupled in an elastically sprung manner to the mirror carrier or mirror foot and with a second end which is latchable into the first detent contour.

9. An outside mirror according to claim 1, wherein the sleeve in a lateral surface has at least one substantially U-shaped notch, thereby forming a detent tongue of said first detent element.

10. An outside mirror according to claim 1, wherein the first detent contour is formed by a substantially conical wall portion in said recess of the mirror carrier.

11. An outside mirror according to claim 1, further comprising a protruding lug movable into engagement in an opposing groove, the lug for limiting a swiveling motion of the mirror carrier, the lug being movable into contact with the ends of the groove disposed as a swiveling limitation on the mirror carrier or mirror foot.

12. An outside mirror according to claim 1, wherein the mirror carrier or mirror foot are manufactured substantially completely from plastics material as injection-moulded parts.

13. An outside mirror according to claim 12, wherein the mirror carrier is a substantially one piece structure or said mirror foot is a substantially one piece structure.

14. An outside mirror for a motor vehicle comprising:
a mirror foot for fastening to the vehicle, said mirror foot having a circular symmetrical retaining element connected thereto in the form of a sleeve with a first detent element having a spring force upon deflection from a rest position;
a mirror carrier with a recess having a first detent contour, said retaining element being inserted into said recess of said mirror carrier such that said mirror carrier is fastened to the mirror foot via the deflection of said first detent element to pass said first detent contour to provide a latching of said first detent element to said first detent contour to assume a latched state, said mirror carrier being rotatable about a defined axis of rotation when said mirror carrier is in said latched state, said first detent element exerting a preloaded initial tension with said first detent element in engagement with the first detent contour so that the first detent element in the latched state braces the mirror carrier with the initial tension elastically against the mirror foot, said retaining element extending in a direction of said axis of rotation;
guide surfaces disposed in said recess of said mirror carrier for receiving said retaining element, said guide surfaces including protruding guide lugs whereby a swiveling motion of said mirror carrier on said retaining element is guided in a radial direction substantially without play;
a second detent contour associated with the mirror foot, the position of the mirror carrier relative to the mirror foot being secured at a position with a defined swivel angle by a latching of said second detent contour to the mirror carrier, said mirror carrier in the latched state being displaceable counter to pressure of the initial tension in the direction of the axis of rotation such that said mirror carrier disconnects from said second detent contour to allow said mirror carrier to rotate about said axis of rotation.

15. An outside mirror for a motor vehicle comprising:
a mirror foot for fastening to the vehicle, said mirror foot having a circular symmetrical retaining element connected thereto in the form of a sleeve with a first detent element exerting a spring force upon deflection from a rest position;
a mirror carrier with an inner surface, said inner surface defining a recess having a first detent contour, said first detent element being flexible to generate a snap in retaining function as said mirror carrier is connected to said mirror foot to assume a connected state such that a free end of said retaining element is inserted into said recess of said mirror carrier, whereby said mirror foot is fastened to said mirror carrier, said first detent element engaging said first detent contour in said connected state, said mirror carrier being rotatable about a defined pivot axis when said mirror carrier is in said connected state, said first detent element in the connected state being movable against said spring force while in engagement with said first detent contour such that said first detent element in the connected state braces said mirror carrier with a specific initial tension elastically against said mirror foot, said retaining element extending in a direction of said pivot axis;
guide surfaces disposed in said recess of said mirror carrier for receiving said retaining element, said guide surfaces including protruding guide lugs whereby a swiveling motion of said mirror carrier on said retaining element is guided in a radial direction substantially without play;
a second detent contour associated with said mirror foot, the position of said mirror carrier relative to said mirror foot being secured at a position with a defined pivot angle via connection of said second detent contour to the mirror carrier, said mirror carrier in the connected state being movable counter to pressure of the spring force in the direction of the pivot such that said mirror carrier disconnects from said second detent contour to allow said mirror carrier to pivot about said pivot axis.

* * * * *